United States Patent [19]

Rogers

[11] Patent Number: 5,478,113
[45] Date of Patent: Dec. 26, 1995

[54] AIRBAG AND INVERTED FOLDING METHOD

[75] Inventor: Mark Rogers, Roy, Utah

[73] Assignee: Morton International, Inc., Chicago, Ill.

[21] Appl. No.: 341,788

[22] Filed: Nov. 18, 1994

[51] Int. Cl.⁶ .................................................. B60R 21/20
[52] U.S. Cl. ........................................ 280/743.1; 280/732
[58] Field of Search .................................. 280/743.1, 732

[56] References Cited

U.S. PATENT DOCUMENTS

| | | | |
|---|---|---|---|
| 4,286,954 | 9/1981 | McArthur et al. | 280/743.1 |
| 5,022,675 | 6/1991 | Zelenak, Jr. et al. | 280/743 |
| 5,240,282 | 8/1993 | Wehner et al. | 280/728 |
| 5,275,435 | 1/1994 | Fischer | 280/743.1 |
| 5,290,061 | 3/1994 | Bollaert | 280/743 |
| 5,324,070 | 6/1994 | Kitagawa et al. | 280/743.1 |
| 5,342,087 | 8/1994 | Oda | 280/743.1 |

Primary Examiner—Kenneth R. Rice
Attorney, Agent, or Firm—A. Donald Messenheimer; Gerald K. White

[57] ABSTRACT

An inflatable airbag (10) for restraining an occupant in a vehicle which is first laid out flat and turned inside out before being rolled into the form of a bag roll. The entire bag is consumed in the roll and the rolling step is continued until the bag roll passes into and through the mouth (14) of the bag thus inverting the entire bag pack so that the roll now stands in front of the bag mouth (14) and on front of the pack. As deployment of the air bag inflator pushes the roll away from the canister, the cushion unrolls in a downward motion toward the lap of the occupant. Because the roll is slightly trapped within itself, the cushion is free to inflate to the sides but must overcome resistance to extend away from the canister. Ultimately, the deployment action of the inverted roll cushion is more lateral and less extended than other known folds.

9 Claims, 2 Drawing Sheets 5,478,113

AIRBAG AND INVERTED FOLDING METHOD

BACKGROUND OF INVENTION

1. Technical Field

The present invention relates to an airbag which is inflatable to restrain an occupant of a vehicle during a collision.

2. Description of Prior Art

Occupant restraint systems for automotive vehicles are in widespread use. It has been generally recognized that it is preferable that an airbag, when inflating, not impact against the head or upper torso of the vehicle occupant. Different ways to accomplish this result with various degrees of effectiveness have been the subject of many patents including U.S. Pat. Nos. 5,290,061 dated Mar. 1, 1994: 5,240,282 dated Aug. 31, 1993; and 5,022,675 dated Jun. 11, 1991; all of which relate to folding techniques.

SUMMARY OF THE INVENTION

The present invention offers a novel technique for folding the airbag which directs the initial displacement of the cushion downward and delays the full longitudinal extension until after a lateral blossoming of the sides of the airbag cushion has occurred.

More specifically, the invention employs a novel procedure for folding or packing a passenger-side airbag cushion within a corresponding airbag module. The bag is first formed and turned inside out. The bag is rolled tightly into a bag roll which passes into and through the mouth of the bag to form a bag pack. The bag pack is positioned in the airbag module when installed in a vehicle so that inflation gas is applied through the bag mouth to the rear of the bag pack and the bag is caused to unroll forwardly toward the occupant in an inverted condition with the outside surface now on the outside of the bag cushion.

As the bag is deployed, the inflation gas pushes the inverted roll away from the canister by unrolling the bag in a downward motion toward the lap of an occupant. Because of the nature of the unrolling action, the roll is slightly trapped within itself. Therefore the cushion is free to inflate to the sides but must overcome resistance to extend away from the canister.

Ultimately, this deployment action of the inverted roll cushion is more lateral and less extended than other known folds.

These and other objects and advantages of the invention will become more fully apparent from the claims and from the following description when read in conjunction with the appended drawings.

DESCRIPTION OF PREFERRED EMBODIMENTS

Figure 1:
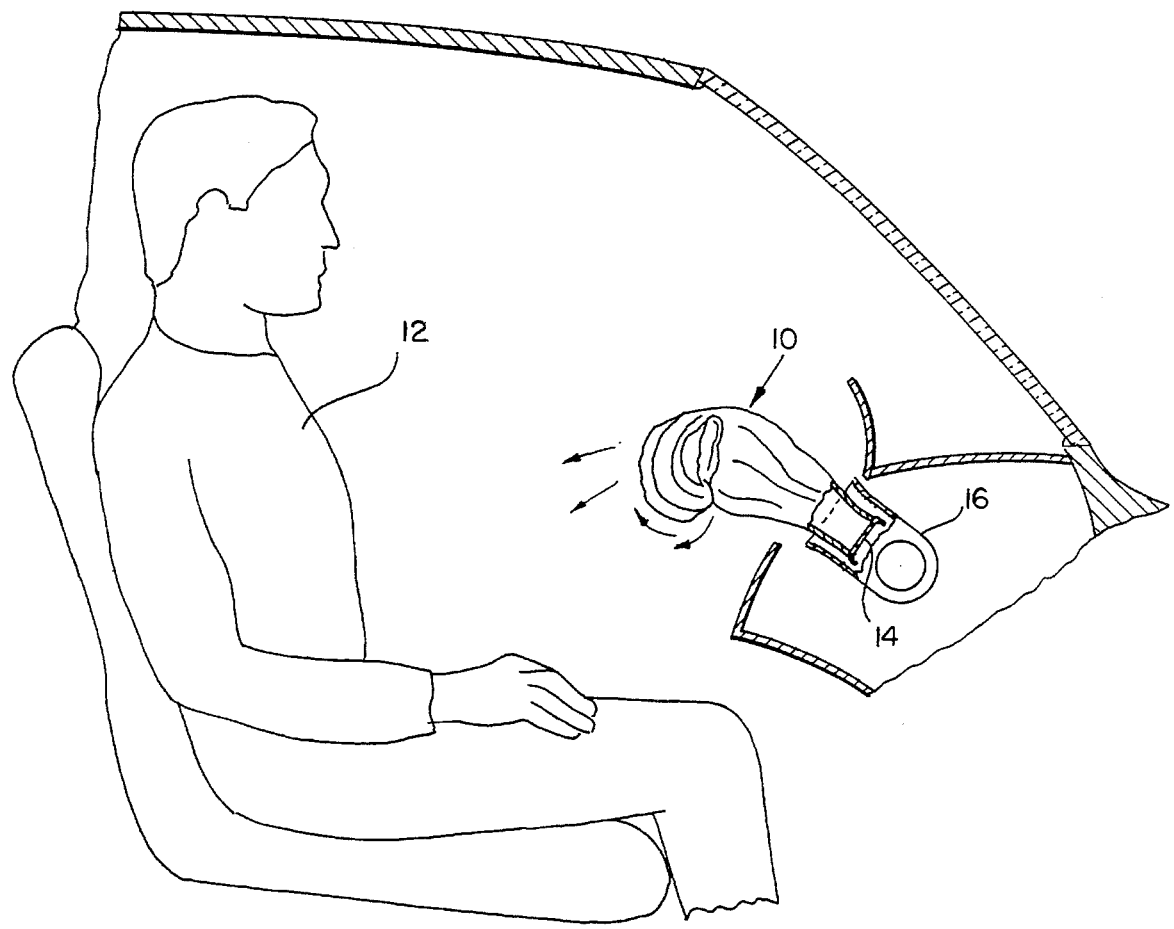
FIG. 1 is a schematic view illustrating an airbag cushion in a partially inflated condition according to the invention.

The present invention is adapted for installation in a conventional location in a vehicle or compartment, usually in front of the compartment occupant so that in the event of a sudden deceleration such as occurs in a collision, the occupant is restrained against injury-causing movements. FIG. 1 diagrammatically illustrates an airbag cushion 10 in its partially inflated condition in front of a passenger 12. The mouth 14 of the airbag cushion 10 may be secured as by being attached in a gastight manner in the airbag module 16 as is generally conventional to receive inflation gas from an inflator.

Figure 2:
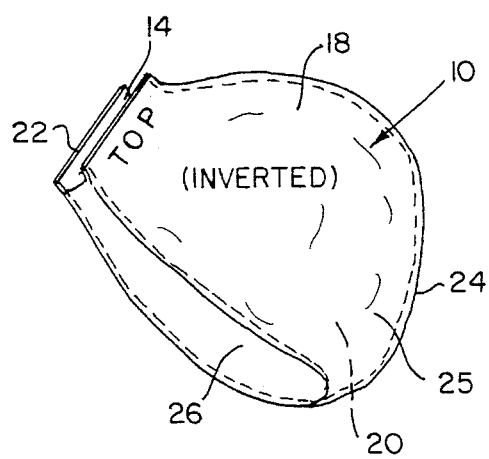
FIG. 2 is a pictorial view of the airbag when turned inside out and before folding.
Figure 3:
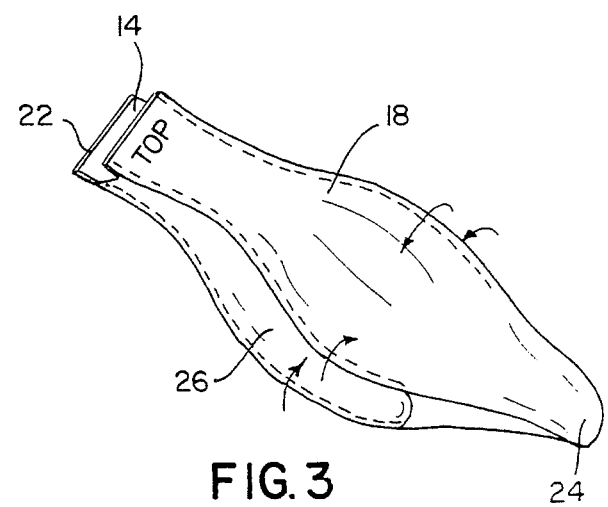
FIG. 3 is a view showing the step of extending the airbag when in a flattened condition.

To obtain certain of the advantages of this invention, the novel bag pack is folded in a specific manner which is characterized by beginning with the airbag material, in its entirety, being turned inside-out, or inverted. This is to be distinguished from the partial inside out fold disclosed in the Bollaert U.S. Pat. No. 5,290,061. The bag used in the present invention may be made in any conventional manner such as by stitching side panels so that a top panel 18 and a bottom panel 20 are formed. Before starting the folding sequence of the present invention, the bag material is turned inside out so that the top panel 18 has its outer surface, that is normally exposed to the ambient, on the inside of the bag and the inner surface, that is normally exposed to the inflation gas, on the outside of the bag as is illustrated in FIGS. 2 and 3. The same is true for the bottom panel 20.

Figure 4:
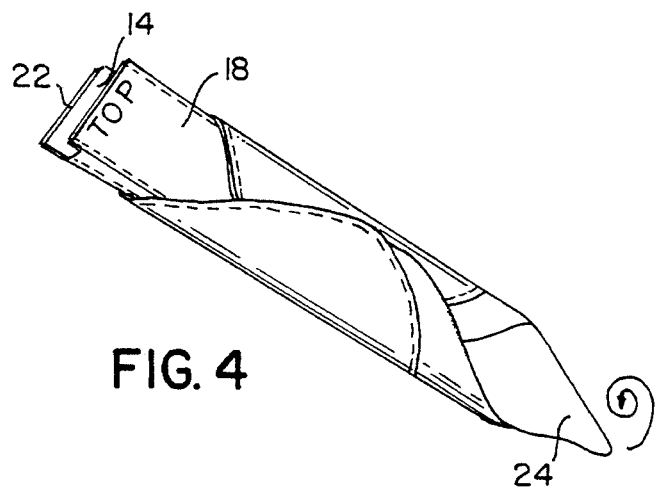
FIG. 4 is a view showing the folding of the side panels to form side edges which give the bag a width that is not substantially greater than the width of the bag mouth.
Figure 5:
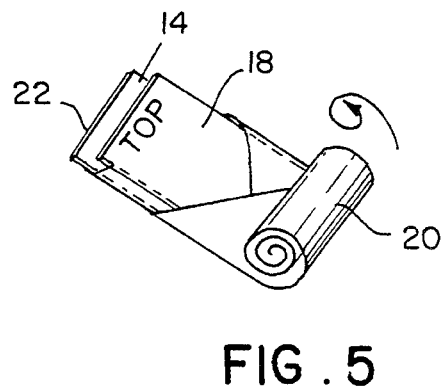
FIG. 5 illustrates the step of rolling to form a bag roll on top of the upper panel.
Figure 6:
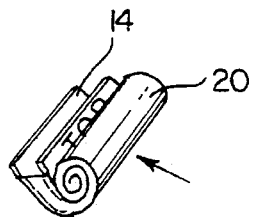
FIG. 6 shows the tightly formed bag roll.

The mouth 14 of the bag or cushion 10 may be secured to a fixture 22 with the top panel 18 facing up and its inside surface exposed to the ambient as illustrated in FIG. 2. The leading edge of the closed free end 24 of bag 10 may be pulled to the fullest extent possible from the bag mouth 14 as indicated by arrow 25, although optionally folds along lateral lines may be also used. The sides 26 should naturally pleat with fold lines running longitudinally. With the pleated bag width not substantially greater than the width of the mouth 14, the bag roll can be formed by beginning the rolling procedure as is illustrated by FIGS. 4 and 5. The closed free end 24 is rolled over, or on top of, the top panel. The roll should be tight and the rolling step continued until the entire bag is consumed in the roll as is shown in FIG. 6 with the bag roll on top of the top panel 18.

Figure 7A:
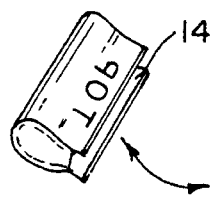
FIG. 7A shows the bag roll passing into and through the bag mouth.
Figure 7B:
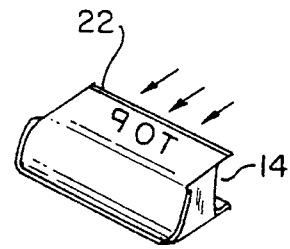
FIG. 7B shows the deployment of inflation pressure to the rear side of the bag roll.

The rolling is continued until the bag is rolled into (see FIG. 7A) and through (see FIG. 7B) the mouth 14 of the bag 10 thus inverting the entire bag pack so that at least part of the roll, if not the entire roll, stands out at the front of the pack. It should be noted that the top panel 18 is in a position facing the compartment occupant as is apparent from FIGS. 8 and 9. The bag is thus positioned while being stowed, so that during deployment, the gas pressure of deployment is urged against the rear side of the pack, i.e. the side remote from the compartment occupant.

While the nature of the packing procedure is such that the bag roll tends to hold itself together once the roll is pushed through the mouth 14 of the bag 10, the bag may optionally be provided with a pocket to hold the roll in place or a conventional secondary retainer made of a material such as TYVEK paper could serve this function.

Figure 8:
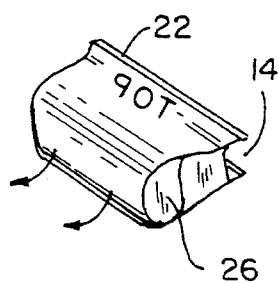
FIG. 8 shows the bag roll as it commences to deploy by rolling from the lower side of the bag roll.
Figure 9:
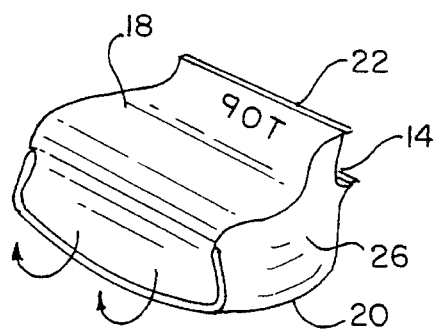
FIG. 9 illustrates the blossoming of the side walls in a lateral direction in advance of full longitudinal deployment of the airbag cushion.

For deployment, inflation gas is generated in any conventional manner and applied through the bag mouth 14 against the rear side of the bag roll to push the bag roll away from the canister of the airbag module (see FIG. 7B) in a forward direction toward the compartment seating area. As shown in FIG. 8, the bag begins to unroll forwardly in a downward direction toward the lap of the compartment occupant. Because of the nature of the unrolling action, the roll is slightly trapped within itself and desirably does not abruptly contact the upper torso of the occupant or the face of a less-than-full-sized adult.

As another important feature, the bag cushion may have a lateral dimension that is much larger than the width of the mouth 14 or fixture 22. For example, the bag may have a shape as illustrated in FIG. 3 where the sides 26 are spaced apart laterally a distance that is substantially greater than the width of the bag mouth 14. The sides should naturally pleat when the bag is lying flat and extended as illustrated in FIG. 3. The pleating should be assisted by laying the material toward the center in alternating layers, i.e. left, right, left, right. This provides a flat, uninflated bag having a desired final width not substantially greater than the width of the mouth 14 or fixture 22. This dimensional relationship allows the bag roll to pass through the bag mouth 14 and to be in a position to unroll without changing directions as the airbag cushion is inflated.

This preferred method of packing the bag causes the bag to blossom wide rather than shooting out straight toward the compartment occupant upon deployment. As deployment of the inflation gas from the inflator pushes the inverted roll from the canister of the airbag module (see FIG. 7B), the bag unrolls in a downward motion toward the lap of the occupant (see FIG. 8). However, because of the nature of the unrolling action, the roll is slightly trapped within itself. Therefore the cushion is free to inflate laterally toward the sides, but must overcome resistance to extend away from the canister. Ultimately, the deployment action of the inverted roll cushion is more lateral and less extended than with use of other known folds.

While certain embodiments of the invention have been described and illustrated, other variations and changes may be made without departing from the spirit of the invention. For example, tethers may be used in some embodiments to an advantage but are not essential in others and various other features may be incorporated if desired along with the present invention.

Such variations and changes as well as others which fall within the scope of the appended claims, are intended to be covered thereby.

What is claimed is:

1. Method of folding and deploying an airbag cushion, said cushion comprising an airbag having an open bag end serving as a mouth, and top and bottom airbag material surfaces exposed to be outer surfaces before the bag is folded that become inner surfaces of the airbag cushion when deployed, comprising:

rolling the top and bottom surfaces with said exposed surfaces in engagement with each other in a first longitudinal direction to form a bag roll that is on top of the top surface at the open bag end and adapted to be secured relative to an airbag module in an occupant carrying compartment; and unrolling the airbag in the same first longitudinal direction by inflation gas passing through the open bag end to cause said airbag to unroll in a direction toward a compartment occupant seating area such that the top and bottom exposed surfaces become inner surfaces exposed to inflation gas of the inflated airbag cushion.

2. Method of claim 1 further applying inflation gas against the roll through the bag mouth to cause the bag to unroll in an inverted manner with the unrolling action causing a downward motion of the bag toward an occupant lap.

3. Method of claim 1 wherein the top and bottom surfaces, when flattened before rolling, have side edges that are generally longitudinally extending and spaced apart laterally by a distance that is greater than the lateral width of the bag mouth and the method further comprising folding the side edges so that the width of the bag when rolled passes into and through the bag mouth to cause inversion of the bag as the bag is unrolled.

4. Method of claim 3 further applying an inflation gas against the roll through the bag mouth to cause the bag to unroll in an inverted manner and the bag material to be slightly trapped within itself to thereby direct inflation gas to cause the sides of the airbag to blossom laterally before the bag becomes fully extended longitudinally.

5. Method of claim 1 further including the step of expanding the airbag laterally as inflation occurs by unrolling the airbag in an inverted manner which causes the airbag roll to become slightly trapped within itself and to restrict the rate of unrolling in the longitudinal direction.

6. Method of folding a compartment airbag cushion having top and bottom airbag material surfaces for use in a corresponding airbag module which method causes the airbag to blossom laterally rather than shooting out longitudinally in an unrestricted manner comprising:

laying the airbag in a generally flattened condition with the bag material turned inside-out and extended from a free end to a mouth of the airbag, said mouth being secured to said fixture with the top surface up;

flattening top and bottom surfaces of the airbag to form longitudinally extending side edges that are spaced apart by a distance that is greater than the width of a bag neck portion at said mouth;

placing bag material including the side edges towards a center line of said bag to form longitudinally extending folds to provide a desired final flattened airbag width which is not substantially greater than the width of said bag mouth portion; and rolling the free end of the bag that is opposite the mouth portion toward the neck portion and into and through the mouth of the bag thus inverting the entire roll of material that forms a bag roll so that at least part of the roll of bag material stands out in front of the fixture closest to a compartment occupant whereby upon inflation, the airbag unrolls by being pushed away from the airbag module toward an occupant seating position in a compartment.

7. Method of claim 6 wherein the bag roll is formed by rolling said free end over the top surface into and through the bag mouth thereby to dispose the bottom surface closest to a compartment occupant.

8. An inflatable airbag pack located adjacent an occupant seating position in a compartment for, when inflated, restraining an occupant, said pack including an airbag having a first deflated, unfolded condition, a second deflated, folded condition and a third inflated, unfolded condition;

said airbag when in said first uninflated, unfolded condition being turned inside out relative to the third inflated, unfolded condition at which time the bag has a top panel having an upper outer surface that is exposed to ambient conditions and an inner surface which is contacted by inflated gas, and a bottom panel having a lower outer surface that is exposed ambient conditions and an inner surface which is contacted by said inflation gas;

said pack in said second condition being folded in the form of a bag roll that is installed in an airbag module which provides inflation gas through a bag mouth to a rear side of the bag roll with at least part of the bag roll standing out in front of the bag mouth; and said bag, while in said first condition and flat prior to folding, being turned inside out so that said inner surfaces of both panels are exposed outwardly and marginal side edges are folded to form a flat bag width not substantially greater than the width of the mouth of the bag as the bag is rolled, starting with a leading free bag edge opposite the mouth, over the top panel with the bag roll having passed into and through the mouth of the bag so that at least part of the bag roll stands out in front of the bag mouth with the upper outer surface of the top panel to face the occupant seating position.

9. An airbag pack as defined in claim 8 being so constructed that upon inflation, the airbag rolls out toward the occupant seating position inverted from said first condition with the side sections blossoming by expanding laterally in advance of the airbag reaching its fully extended longitudinal position away from the airbag module.

* * * * *